United States Patent Office 3,501,424
Patented Mar. 17, 1970

3,501,424
COATING COMPOSITION CONTAINING ALKALINE AND NON-ALKALINE PIGMENT WITH BINDER AND DISPERSANT
Saburo Imoto, Kyoichiro Ikari, and Tatsuaki Hattori, Kurashiki-shi, Japan, assignors to Kurashiki Rayon Co., Ltd., Kurashiki-shi, Japan, a corporation of Japan
No Drawing. Filed July 8, 1966, Ser. No. 563,715
Claims priority, application Japan, July 14, 1965, 40/42,499; Sept. 9, 1965, 40/55,281
Int. Cl. C09d 3/74, 7/00
U.S. Cl. 260—17.0         5 Claims

ABSTRACT OF THE DISCLOSURE

A coating composition for high grade paper comprising a major amount of a mixture of an alkaline pigment, such as satin white and a non-alkaline pigment, such as clay, and a minor amount of polyvinyl alcohol as a pigment binder. The mixture of pigments and binder is provided with a minor amount of a dispersant which is a high molecular weight carboxyl or sulfo radical-containing compound or a compound having at least one —OH, N—, NH— or $NH_2$— radical and at the same time at least two —COOX radicals wherein X denotes H, Na, K or $NH_4$. The dispersant is provided in an amount sufficient to reduce the viscosity of the coating composition, the amount being at least 2% by weight of the total amount of alkaline pigment.

---

This invention relates to coating compositions for high grade paper which compositions have good coating ability and satisfactory water resistance.

In the manufacture of high grade, coated paper such as art paper and some mechanically coated cardboards, coating preparations containing a mixture of clay and alkaline paper pigments such as satin white (i.e., $3CaO \cdot Al_2O_3 \cdot 3CaSO_4 \cdot 3H_2O$)

which may contain free lime and other ions as impurities, have been employed. Satin white is often used in combination with a pigment binder, for instance, a nonionic, high molecular weight, organic compound such as polyvinyl alcohol (hereinafter referred to as PVA) or starch. Such binders give highly viscous coating preparations, which when allowed to stand will have an increased viscosity or will gel beyond limits for practical use. For example, PVA having a polymerization degree of 1750 and a saponification degree of 98.5 molar percent, in a 40% coating solution in which satin white accounts for more than 10% of the total amount of pigments used, will give a viscosity of more than 10,000 cps., and thus a coating composition which fails to provide a uniformly and smoothly coated, water-resistant surface. If PVA having lower degress of polymerization and saponification is used instead, the viscosity of the resulting coating solution will be decreased but the decrease is so negligible that it cannot begin to solve the problem of coating fluidity. The essential reason for the failure of PVA satin white slurries to provide the desired viscosity is because PVA is highly reactive with satin white and thus satin white PVA slurries naturally have high viscosity indices. Consequently, it has been very difficult, if not impossible, to obtain a PVA satin white slurry with a sufficiently decreased viscosity. Further, in preparing coating solutions for paper, satin white may also be compounded with calcium carbonate, titanium dioxide and other ingredients as well as with clay. Any of these combinations may present a need for reducing the viscosity of the resulting composition.

The present invention overcomes these difficulties and provides coating compositions for high grade paper which are substantially less viscous in aqueous form, possess excellent water resistance and leave more satisfactory coating ability than conventional products. In accordance with the present invention, a paper coating composition comprising as a major amount (based on solids) of a mixture of alkaline paper pigment and ordinary or non-alkaline paper pigment, and a minor amount (based on solids) of pigment binder is provided with a minor amount (based on solids) of a dispersant selected from the group consisting of carboxyl radical (—COOH) containing high molecular weight compounds, sulfonic acid or sulfo radical (—$SO_3H$) containing high molecular weight compounds, and compounds which have at least one member of the class consisting of —OH, N—, NH—, and $NH_2$— atoms or radicals and at the same time more than two COOX radicals, wherein X denotes H, Na, K, or $NH_4$, in the molecule. Mixtures of any two or more of these dispersant compounds can be used, if desired.

The high molecular weight compounds containing carboxyl or sulfonic acid radicals which are used in the invention include the carboxyl or sulfonic acid radical-containing cellulosic materials or their alkali metal salt forms as for instance, gum arabic, sodium ligninsulfonate, carboxymethyl cellulose and the like; and vinyl polymers having carboxyl or sulfonic acid groups or their alkali metal forms such as sodium polyacrylate, PVA and polyvinyl acetate in which carboxyl or sulfonic acid radicals are introduced by copolymerization or other chemical reaction. It should be noted, however, that the high molecular compounds containing carboxyl or sulfonic acid radicals are not effective for lowing the viscosity of the coating solutions of the invention if their molecular weight is excessively low, for instance, less than about 300. On the other hand, it is also undesirable for them to have too high a molecular weight, for example, in excess of about 300,000 or such as to give rise to insufficient water-solubility, because of the possibility of affording a corresponding and excessive increase in the viscosity of the coating solution. Illustrative of ineffective low molecular weight compounds are terephthalic acid and sebacic acid. Carboxymethyl cellulose and sodium polyacrylate, if employed, should be as low in molecular weight as possible. If their molecular weight is too high, the results may be unsatisfactory. The dispersant compounds of the invention should be non-cyclicable, for instance compounds having electrolytic radicals in positions tending to effect cyclic formation as, for example, in maleic anhydride-vinyl acetate copolymers and their saponification products, although lowering the viscosity of satin white-containing aqueous coating compositions, fail to provide mixtures having adequate viscosity stability and cause a continual increase in the viscosity of the coating composition until gelation occurs. On the other hand, monoesters of phthalic acid, PVA and monoesters of maleic anhydride prepared from PVA are useful in sufficiently lowering the viscosity of satin white-containing coating compositions though a viscosity stabilization problem may remain.

The compounds for use in the invention which have at least one member of the class consisting of —OH, N—, NH—, and $NH_2$— radicals and at the same time at least two COOX radicals (wherein X denotes H, Na, K or $NH_4$) are often water-soluble and are preferably the alkaline salts of hydroxyl and nitrogen-containing compounds such as the sodium salts, potassium salts, and ammonium salts of citric acid, tartaric acid, malic acid, dipicolinic acid, iminodiacetic acid, nitrotriacetic acid, β-oxyethyliminodiacetic acid, tetramethylene diamine tetraacetic acid, and glutamic acid, all satisfactory $Ca^{++}$ ligands.

As will be apparent from the foregoing, free lime and other metallic ions which occur in satin white can form coordination compounds with the dispersants of the invention. These coordination compounds thoroughly disperse the satin white without the ions bridging themselves with the high molecular weight compounds present such as the binders and dispersants and without affecting the dispersibility of the pigment components. Accordingly, the coordination compounds can keep the viscosity of the coating solutions always at low levels.

The dispersants added to the aqueous paper coating compositions in the practice of the invention are provided in minor amounts sufficient to substantially reduce the viscosity of the coating composition and improve its coating ability and water resistance. Ordinarily, the amount employed is at least about 2%, often up to about 10% by weight or more preferably about 3 to 6% by weight, of the total amount of alkaline pigment. Amounts less than about 2% usually cannot improve the fluidity of the mixed pigment slurry.

Illustrative of alkaline pigments suitable for use in the invention include satin white and calcium carbonate. Examples of suitable ordinary pigments are clay and titanium oxide. The total pigment, i.e., both alkaline pigment and ordinary pigment, is a major amount of the total solids content of the composition which can vary widely. Most advantageously, the amount of total pigment is at least about twice the amount the pigment binder and may be up to about 15 or even 25 times or more by weight of the pigment binder. The proportion of ordinary pigment to alkaline pigment in parts by weight is generally about 1 to 10:1, preferably about 5 to 7:1.

The water-soluble pigment binders of the invention include, for example, casein, starch and PVA or derivatives thereof, which may be employed either singly or in combination. The PVA may be polyvinyl alcohol per se, either completely saponified or derivatives thereof such as copolymers of vinyl alcohol and vinyl ether. The degree of polymerization of the polyvinyl alcohol may vary widely, but is often at least about 1000. The preferred pigment binder is PVA, but the invention makes possible at least partial replacement with other pigment binders such as starch without an adverse effect upon viscosity and without apparent difference from compositions having only PVA-containing polymers as a pigment binder. Generally the pigment binder is present in the composition in minor amounts usually about 1 to 25%, preferably about 3 to 20% by weight based on the total solids.

The coating compositions may also include other ingredients but care should be taken in their selection in that they could have an adverse effect on the viscosity of the final solution. For example, if latex is used in combination with the composition of the invention, the type of latex used brings a marked variation in the viscosity of resulting coating solution just as the type of clay used does. For example, Dow latex 686 (a product of Dow Chemical Co. having a solid content of 48% with a denatured styrene-butadiene ratio of 60:40, adapted for paper processing) has a high adhesive ability but is not suitable for use with satin white because the combination gives a coating solution having a very high viscosity. On the other hand, Dow latex 612 (also a product of Dow Chemical Co. having a solid content of 48% with a styrene-butadiene ratio of 60:40) can provide a desirable coating solution of a low viscosity. Examples of additional ingredients which can be added to improve the water resistance of the coating compositions prepared in accordance with the invention, are water-resisting agents such as calcium stearate and metallic compounds of tin, zinc, copper, and titanium may be added.

The compositions of the invention are applied in a water base, that is, they are mixed with sufficient water to make workable and have characteristics such as to give a viscosity suitable for application to paper, e.g., often less than about 5000 cps. and preferably about 200–1000 cps. The aqueous compositions of the invention contain sufficient solids to give a satisfactory coating and give rise to a viscosity problem. Normally the aqueous medium contains about 30 to 70% solids.

The invention is more fully described by reference to the following examples but it is to be understood that the invention is not in any way limited thereto.

EXAMPLE 1

Separate aqueous solutions of satin white in a concentration of 25% were mixed with separate aqueous solutions of gum arabic, sodium lignin-sulfonate, and sodium polyacrylate, respectively, each in a concentration of 10%, to prepare 9 samples of 20% slurries wherein the latter three components in terms of pure contents was 3%, 5%, and 10%, respectively, of the amount of satin white in each sample solution.

Meanwhile, clay dispersed with 0.4% of sodium hexametaphosphate to a clay concentration of 60% was mixed with a 15% aqueous solution of PVA (of polymerization degree 1750 and saponification degree 98.5 mol. percent), and the mixture was added to the 9 samples of satin white system. Next, Dow latex 612 was compounded with the above mixture, and the whole mixture was agitated by a mixer for one minute to thereby prepare coating solutions having a solids concentration of 38%.

The compositions of the coating solutions thus prepared were as follows:

| | Parts |
|---|---|
| "Shokozan" special clay (clay from Shokozan, Hiroshima Pref.) | 85 |
| Sodium hexametaphosphate | 0.34 |
| Satin white | 15 |
| PVA (polym. deg. 1750; saponif. deg. 98.5 mol. percent) | 6.1 |
| Dow latex 612 | 12.2 |

Nine different solutions were prepared wherein gum arabic, sodium ligin-sulfonate, and sodium polyacrylate in terms of pure contents accounted, respectively, for 3%, 5%, and 10% of the amount of satin white.

The viscosity values of these nine types of coating solutions and the properties of paper coated therewith are shown in Table 1. The results of a control prepared without gum arabic, sodium lignin-sulfonate, or sodium polyacrylate are also given. The control had such a high viscosity that it was applied in a concentration of 30%. Water resistance of samples tested was determined by placing test specimens of coated paper on black paper,

TABLE 1

| Additive | Amt. of additive (satin white=100) | Viscosity of coating sol. (cps.) | Whiteness of coated paper (percent) | Luster of coated paper (percent) | Print luster (percent) | Print pick (percent) | Water resistance |
|---|---|---|---|---|---|---|---|
| Gum arabic | 10 | 278 | 81.7 | 23.9 | 36.1 | 160 | F |
| Do | 5 | 385 | 82.8 | 23.9 | 43.8 | 150 | F |
| Do | 3 | 9,400 | 88.2 | 22.4 | 37.8 | 100 | G |
| Sodium ligninsulfonate | 10 | 606 | 81.6 | 23.1 | 38.4 | 125 | G |
| Do | 5 | 580 | 81.4 | 23.7 | 48.8 | 125 | G |
| Do | 3 | 766 | 81.6 | 23.7 | 41.0 | 125 | G |
| Sodium polyacrylate | 10 | 1,230 | 81.3 | 22.6 | 36.2 | 125 | F |
| Do | 5 | 480 | 81.5 | 22.9 | 41.2 | 175 | G |
| Do | 3 | 2,850 | 81.0 | 23.8 | 50.0 | 125 | E |
| No additive | 0 | Over 20,000 | 80.2 | 22.4 | 30.4 | 50 | P | moistening the paper with finger tips, rubbing them with index finger, and thus judging the degrees of whitening of black paper in order to give marks E (Excellent), G (Good), F (Fair), and P (Poor), accordingly. The amount of coat deposited on each test specimen was 20 g./m.².

As can be seen from the table, invariably favorable results were obtained with coated paper for which the viscosity of coating solutions were lowered by the addition of gum arabic, sodium lignin-sulfonate, or sodium polyacrylate to satin white in accordance with the invention. Further, when the PVA of a polymerization degree of 1750 and a saponification degree of 98.5 mol. percent was replaced by a PVA having a polymerization degree of 550 and a saponification degree of 88 mol. percent, the coating solutions acquired lower viscosity, and paper coated therewith had greater luster than otherwise.

EXAMPLE 2

10% gum arabic and sodium polyacrylate were mixed at a ratio of 1:1 and the mixture was added to an aqueous solution of satin white (25% concentration) at a concentration of 5% (of the total amount of satin white). This solution was called A.

10% sodium lignin-sulfonate and 10% sodium polyacrylate in water were mixed at a ratio of 1:1 and the mixture was added to an aqueous solution of satin white (25% concentration) at a concentration of 5% (of the total amount of satin white). This solution was called B.

The small amount of sodium polyacrylate of solution A is intended to improve the water resistance of the coated paper while the inexpensive gum arabic is intended to make up for the drop in viscosity of the coating solution.

The sodium polyacrylate in solution B was intended to improve the water resistance of coated paper while the small amount of inexpensive sodium lignin-sulfonate was intended to decrease the viscosity of the coating solution. Use of excessive amounts of sodium lignin-sulfonate should be avoided since they may cause undesirable coloring.

Aside from the above solutions, a 15% aqueous solution of PVA (of a polymerization degree of 1750 and a saponification degree of 98.5 mol. percent) was mixed in an aqueous dispersion of clay in a concentration of 65% dispersed with sodium hexametaphosphate in an amount of 0.4% of the total amount of clay. The mixed clay-PVA solution was mixed with each of the solutions A and B, and finally with Dow latex 612. Thereafter, each mixture was agitated to thereby prepare 40% solids conc. low-viscosity aqueous coating solutions of the following compositions.

The compositions of the resulting coating solutions were:

| | Parts |
|---|---|
| "Shokozan" special clay | 85 |
| Sodium hexametaphosphate | 0.34 |
| Satin white | 15 |
| PVA (polym. deg. 1750; saponif. deg. 98.5 mol. percent) | 5 |
| Dow latex 612 | 10 |
| A 1:1 mixture of gum arabic and sodium polyacrylate, or a 1:1 mixture of sodium lignin-sulfonate and sodium polyacrylate | 0.75 |

The solutions of the two different compositions as above specified were applied to fine paper at a rate of 20 g./m.², dried at 100° C. for 2 minutes, and super calendered. The paper sheets thus obtained showed good water resistance and print luster.

EXAMPLE 3

To 15 parts of satin white was added sodium citrate in different amounts of 3%, 5% and 10% (of the amount of satin white). To each of the mixtures thus prepared, an aqueous solution containing 85 parts of clay (wherein sodium hexametaphosphate in terms of net content was added in an amount of 0.4% of the amount of clay), a solution containing 6 parts of PVA (polymerization degree 1750 and saponification degree 98.5 mol. percent), a solution containing 12 parts of Dow latex 612, and water were added to a concentration of 38%. After thorough stirring, the viscosity of each solution was determined with a type B viscometer. The results were as shown in Table 2.

TABLE 2

| Dispersant | Amt. of dispersant (percent) (satin white=100) | Viscosity Immediately after prep. (cps.) | Viscosity Two days after prep. (cps.) |
|---|---|---|---|
| Sodium citrate | 3 | 4,960 | 4,000 |
| Do | 5 | 365 | 380 |
| Do | 10 | 290 | 280 |

As can be seen from the data of Table 2, the products were well-dispersed coating solutions, low in viscosity and of good viscosity stability.

EXAMPLE 4

The same procedure as described in Example 3 was followed except that sodium citrate was replaced by three different compounds, i.e., sodium tartarate, sodium succinate, and sodium nitrilotriacetate. The resulting coating solutions were tested for viscosity, and gave the results shown in Table 3. For purpose of comparison, the viscosity of a coating solution prepared without dispersant is also given in the table.

TABLE 3

| Dispersant | Amt. of dispersant (percent) (satin white=100) | Viscosity Immediately after prep. (cps.) | Viscosity Two days after prep. (cps.) |
|---|---|---|---|
| Sodium tartarate | 5 | 850 | 750 |
| Sodium succinate | 5 | 2,400 | 10,000 |
| Sodium nitrilotriacetate | 5 | 350 | 330 |
| No dispersant | 0 | 5,000 | <20,000 |

As can be seen from the table, the coating solutions of this invention thus obtained were invariably well dispersed, low in viscosity, and of good stability. Such results were not obtained when no dispersant or sodium succinate dispersant was used.

The embodiments of the invention in which an exclusive property or privilege is claimed are defined as follows:

1. A coating composition for high grade paper comprising as a major amount, a mixture of an alkaline pigment selected from the group consisting of satin white and calcium carbonate and non-alkaline pigment selected from the group consisting of clay and titanium dioxide, and a minor amount of polyvinyl alcohol as a pigment binder, said mixture of pigments and pigment binder being provided with a minor amount sufficient to provide a coating of substantially reduced viscosity of a dispersant selected from the group consisting of (A) carboxymethyl cellulose and (B) sodium polyacrylate.

2. The coating composition of claim 1, wherein the dispersant is carboxymethyl cellulose.

3. The coating composition of claim 1, wherein the disperant is sodium polyacrylate.

4. The coating composition of claim 1, wherein the amount of said dispersant is greater than 2% by weight of the total amount of alkaline pigment.

5. The coating composition of claim 1, wherein the amount of dispersant is about 3 to 10% by weight of the total amount of alkaline pigment.

(References on following page)

References Cited

UNITED STATES PATENTS 2,641,557  6/1953  Green _____ 117—152

OTHER REFERENCES

G. P. Colgan et al., "The Use of Polyvinyl Alcohol As A Color Coating," TAPPI, vol. 44, No. 11, November 1961, pp. 818–822.

The Condensed Chemical Dictionary, 6th edition, 1961, p. 920.

Chem. Abstract, vol. 52:13, p. 210.

JULIUS FROME, Primary Examiner

T. MORRIS, Assistant Examiner

U.S. Cl. X.R.

106—141, 148, 209, 214; 260—17.5, 41

Notice of Adverse Decision in Interference

In Interference No. 97,781 involving Patent No. 3,501,424, S. Imoto, K. Ikari and T. Hattori, COATING COMPOSITION CONTAINING ALKALINE AND NON-ALKALINE PIGMENT WITH BINDER AND DISPERSANT, final judgment adverse to the patentees was rendered May 19, 1972, as to claims 1, 2, 3 and 5.

[*Official Gazette July 4, 1972.*]